United States Patent
Loveland et al.

(10) Patent No.: US 10,040,502 B2
(45) Date of Patent: Aug. 7, 2018

(54) VEHICLE WITH SPHERICAL WHEELS

(71) Applicant: Early Rider Limited, Goodworth Clatford, Hampshire (GB)

(72) Inventors: Andrew Loveland, Henley-on-Thames (GB); Robert Upton, Totnes (GB)

(73) Assignee: Early Rider Limited (GB)

( * ) Notice: Subject to any disclaimer, the term of this patent is extended or adjusted under 35 U.S.C. 154(b) by 0 days.

(21) Appl. No.: 15/326,193

(22) PCT Filed: Jul. 13, 2015

(86) PCT No.: PCT/GB2015/052016
§ 371 (c)(1),
(2) Date: Jan. 13, 2017

(87) PCT Pub. No.: WO2016/009184
PCT Pub. Date: Jan. 21, 2016

(65) Prior Publication Data
US 2017/0203808 A1    Jul. 20, 2017

(30) Foreign Application Priority Data
Jul. 14, 2014   (GB) .................................. 1412493.7

(51) Int. Cl.
*B62K 9/00* (2006.01)
*B62K 17/00* (2006.01)

(52) U.S. Cl.
CPC ................ *B62K 9/00* (2013.01); *B62K 17/00* (2013.01)

(58) Field of Classification Search
None
See application file for complete search history.

(56) References Cited

U.S. PATENT DOCUMENTS

| 2,787,970 A | | 4/1957 | Bennett | |
|---|---|---|---|---|
| 3,152,813 A | * | 10/1964 | Brown | A63G 13/02 280/11.19 |
| 3,379,454 A | * | 4/1968 | Woodman | B60B 33/08 280/87.042 |

(Continued)

FOREIGN PATENT DOCUMENTS

| BE | 893233 | 9/1982 |
|---|---|---|
| GB | 2190635 | 11/1987 |

(Continued)

OTHER PUBLICATIONS

Search Report for Priority Application No. GB1412493.7, United Kingdom Intellectual Property Office, Dec. 22, 2015.

*Primary Examiner* — John D Walters
*Assistant Examiner* — Hilary L Johns
(74) *Attorney, Agent, or Firm* — Emerson Thomson Bennett LLC; Daniel A. Thomson

(57) ABSTRACT

A vehicle (1) comprises a frame (17); a front ground engaging sphere (2) which is rotatable about a first axis which is transverse and fixed relative to the frame (17); a rear ground engaging sphere (3) which is rotatable about a plurality of axes, and gripping portions (11) which are provided towards the front of the vehicle (1), for a rider to hold. A support member (25) is connected pivotally to a rear portion of the frame (17) and projects longitudinally of the vehicle (1) and downwardly from the point of connection to the frame (17) to a remote part of the support member (25). The rear sphere (3) is connected to the remote part of the support member (25) for rotation about a second axis which is transverse and fixed relative to the support member (25). The support member (25) is pivotal with respect to the frame (17) about a third axis which extends downwardly and longitudinally of the vehicle (1).

8 Claims, 2 Drawing Sheets

(56) References Cited

U.S. PATENT DOCUMENTS

| | | | | |
|---|---|---|---|---|
| 3,401,421 A * | 9/1968 | Aninger | ................ | B60B 33/08 16/25 |
| 3,794,351 A * | 2/1974 | Cudmore | ................ | B62H 7/00 280/204 |
| 4,150,838 A * | 4/1979 | Lappage | ................ | A63C 17/01 280/843 |
| 4,225,147 A * | 9/1980 | Lowery | ................ | A63C 17/16 280/11.226 |
| 5,288,092 A | 2/1994 | Miller et al. | | |
| 5,409,265 A * | 4/1995 | Douglass | ................ | A63C 17/01 280/11.27 |
| 5,826,674 A * | 10/1998 | Taylor | ................ | A63C 17/12 180/181 |
| 6,568,695 B2 * | 5/2003 | Dornan | ................ | A63C 5/035 280/11.227 |
| 6,802,381 B1 * | 10/2004 | Koors | ................ | B62D 57/00 180/7.1 |
| 8,028,775 B2 * | 10/2011 | Orenbuch | ................ | B60B 33/08 180/252 |
| 8,226,095 B2 * | 7/2012 | Reyes, Jr. | ................ | A63C 17/016 280/11.226 |
| 8,226,096 B2 * | 7/2012 | Reyes, Jr. | ................ | A63C 17/016 280/11.226 |
| 8,459,667 B2 * | 6/2013 | Ungar | ................ | B62K 1/00 280/87.01 |
| 8,864,150 B2 | 10/2014 | Loveland | | |
| 2002/0070514 A1 * | 6/2002 | Costa, Jr. | ................ | A63C 17/004 280/11.226 |
| 2008/0283311 A1 * | 11/2008 | Li | ................ | B60B 19/14 180/65.1 |

FOREIGN PATENT DOCUMENTS

| | | |
|---|---|---|
| JP | 2010202154 | 9/2010 |
| WO | 2011/075497 | 6/2011 |
| WO | 2012/104622 | 12/2012 |

* cited by examiner

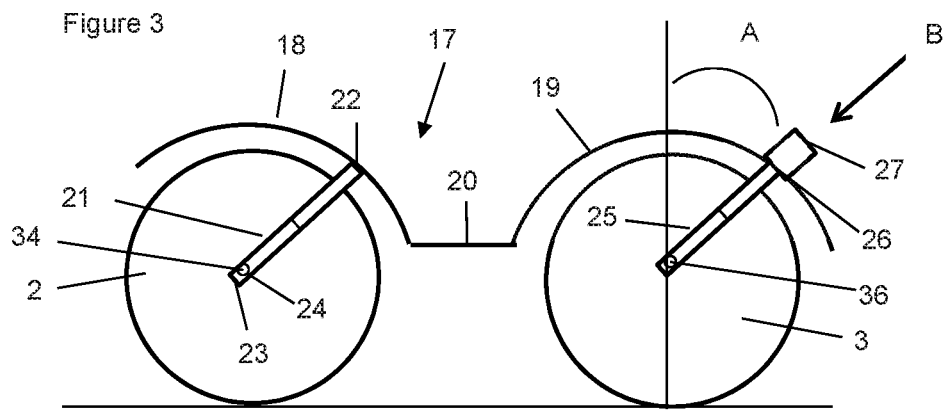
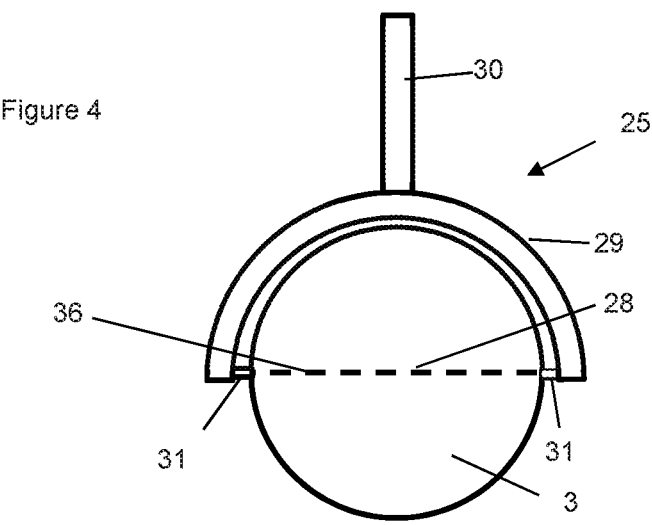
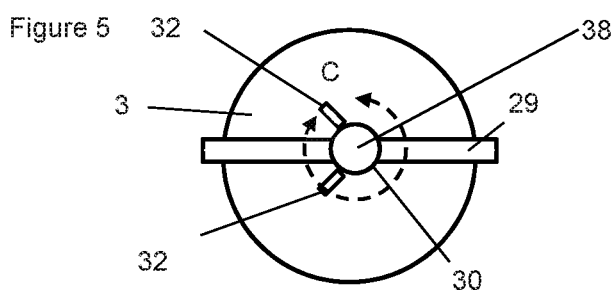

VEHICLE WITH SPHERICAL WHEELS

This invention relates to a vehicle. More particularly, but not exclusively, the invention relates to a vehicle which can be propelled by a person sitting on the vehicle with the person's feet engaging the ground.

There are known vehicles of this type which are bicycles. The person's feet are used to push the bicycle along, rather than pedals. Such bicycles are sometimes referred to as "balance bikes". The rider can develop a sense of balance without the complication of using pedals, and can learn to coast for distances with both feet raised off of the ground. Typically, a balance bike will have handlebars which can be used to turn the front wheel so that the bike can be steered.

Particularly in the case of very young children, typically up to about two years old, a conventional balance bike can be too difficult to control. In PCT Patent Application WO 2010/116126 there is disclosed a vehicle for use by a young child, in which the front and rear wheels are replaced by spheres, both of which are rotatable about three orthogonal axes. The feet of the rider engage the ground and the vehicle is propelled along the ground by the rider's feet. There is a transverse handle for the rider to hold, but this is fixed and does not serve to steer the vehicle. Instead, steering is controlled by use of the rider's feet on the ground and by the rider shifting weight. Whatever direction the rider chooses to move in, the spheres will rotate about whatever axis necessary, to accommodate the change in direction.

To simplify use of vehicle of this type, in PCT Patent Application WO 2012/104622 there is disclosed a modification in which only the rear sphere is rotatable about three orthogonal axes. The front sphere is rotatable about a single transverse axis. Again, there is a transverse handle for the rider to hold, but this is fixed and does not serve to steer the vehicle; and steering is controlled by use of the rider's feet on the ground and by the rider shifting weight.

Some embodiments of the present invention are a development of the vehicle disclosed in PCT Patent Application WO 2012/104622, in which the rear sphere is mounted in a different manner but can still rotate so as to accommodate changes in direction of the vehicle.

Viewed from a first aspect, the invention provides a vehicle which comprises a frame; a front ground engaging sphere which is rotatable about a first axis which is transverse and fixed relative to the frame; a rear ground engaging sphere which is rotatable about a plurality of axes, and gripping portions which are provided towards the front of the vehicle, for a rider to hold;

characterised in that a support member is connected pivotally to a rear portion of the frame and projects longitudinally of the vehicle and downwardly from the point of connection to the frame to a remote part of the support member; the rear sphere is connected to the remote part of the support member for rotation about a second axis which is transverse and fixed relative to the support member; and the support member is pivotal with respect to the frame about a third axis which extends downwardly and longitudinally of the vehicle.

In some embodiments the third axis passes through the rear sphere, preferably through the centre of the rear sphere or adjacent to (i.e. close to) the centre of the rear sphere. Preferably the combination of the rear sphere and the support does not operate as a conventional castor, and the third axis should not lie too far from the centre of the rear sphere. Preferably a feature of some embodiments of the design is that the outer surface of the sphere does not change position, i.e. there is not the wiggle that there is with a castor as it revolves around its axis. However, it may be that a little deviation of the third axis from the centre of the sphere makes an improvement in performance.

Generally speaking, a sphere is a specific geometric object, but in the contact of the present invention in practical embodiments a perfect sphere may not be used. For example the "sphere" may be a body that has a spherical contact surface but for example the ends may be truncated where the bearings are and there may be further truncation as desired. It may also be that moving slightly away from a true spherical contact may help with self-centring. Thus in the context of the present invention, the expression "sphere" means a body having a substantially or approximately spherical ground engaging contact surface, regardless of the shape of the remainder of the body.

Preferably, the support member extends forwardly from the point of connection of the support member to the frame; and the third axis extends downwardly and forwardly from the point of connection of the support member to the frame.

In some preferred embodiments, the vehicle is propelled by a user's feet engaging the ground. However the invention is also applicable to vehicles propelled additionally or alternatively by other means, such as by using foot powered pedals and/or a power source such as an electric motor or an internal combustion engine.

In some preferred embodiments, the vehicle is a sit on vehicle and a seat is provided for a rider. This could be provided between the front and rear spheres, or at least partially over the rear sphere. However, the vehicle is also applicable to stand on vehicles such as powered or unpowered scooters.

In some embodiments, the vehicle of the present invention uses, and thereby develops, the rider's intuitive sense of balance and directional motion as the rider moves and directs the vehicle. Additionally or alternatively, a vehicle of the present invention may provide interesting and entertaining new riding experience.

In the case of a sit on vehicle which is propelled by the riders feet engaging the ground, when the rider wishes to propel the vehicle forward, the rider simply pushes backwards with their feet against the ground causing the vehicle to move forward as the spheres rotate about their transverse axes. The configuration of the vehicle causes it to respond to the rider's intention to turn by responding to changes in the rider's body position, as explained below.

When the rider wishes to turn the vehicle while moving forward (for example consider the case that the rider wishes to turn the vehicle to the right) it is instinctive for the rider to lean in the direction that they wish to turn, i.e. to lean to the right. In order to maintain balance on the vehicle, the rider needs to maintain their centre of mass over the ground engaging spheres. The rider would achieve this by shifting their lower body to the left to compensate for the lean of their upper body to the right as they attempt to turn the vehicle.

The result of the shifting of the lower body to the left is a force to the left on the frame, which is then transmitted to the ground engaging spheres.

Where the rear sphere engages with the ground, the ground exerts a frictional force opposing the leftward movement of the rear sphere in response to the force exerted by the rider. The result of the frictional force of the ground to the right and the force exerted by the rider to the left is a net torque having a component about the third axis.

Due to the torque about the third axis, the rear wheel is rotated about the third axis such that the second axis is no longer parallel to the ground. In addition, due to the acute angle of the third axis, this also results in the second axis no longer being parallel to the first axis of the front ground engaging sphere.

The result of the first and second axes no longer being parallel is that when the vehicle is propelled forwards, the ground engaging spheres rotate such that the vehicle turns whilst moving forwards, rather than moving directly forwards.

For young riders the movement of the sphere is not just for steering. When a rider is using a conventional bicycle and lose balance in one direction, without even realising it there is a tendency to steer sharply in the direction that the bike is tipping. The effect is to drive the front wheel under the falling mass and in so doing helping to right the bike. The same is the case with at least some embodiments of the present invention—the rear sphere automatically turning in the direction of a fall helps to keep the ride on beneath the rider for as long as possible and thereby support the rider for as long as possible. The arrangement gives the child a few extra moments to make the connection between their senses and their motor system and subsequently co-ordinate a response that keeps them upright.

As mentioned above, it is preferable for the support member and thus the third axis to extend downwardly and forwardly from the point of connection of the support member to the frame. The result of this configuration is that the turning circle of the vehicle is such that when the rider leans to the right, the vehicle turns to the right. Similarly, when the rider leans to the left, the vehicle turns to the left.

Although it is preferable, as discussed above, for the support member to extend forwardly and downwardly from the point of connection of the support member to the frame, the Applicant has appreciated that other advantages are provided if the support member extends downwardly and rearwardly from the point of connection of the support member to the frame. In particular, this could be useful for providing a drifting motion of the vehicle, as having the support member extending rearwardly rather than forwardly reverses the direction of the turning circle in response to the rider shifting his weight. The rider could thus control the vehicle by using their feet to shift their entire body weight (in contrast with shifting their lower body in response to the leaning action as discussed above). For example, if the rider shifts their weight to the left, the vehicle will turn to the left. This control of the vehicle to exert a drifting motion may be more suitable, for example, for much younger riders.

Where the support member extends rearwardly rather than forwardly, certain parameters of the vehicle (e.g. the angles of the support member, axes, etc.) may have different optimal values from the values for the case where the support member extends downwardly and forwardly.

In accordance with this first aspect of the invention, the direction of the third axis could alternatively be expressed as follows: The third axis lies in a vertical plane that passes through the front and rear spheres, for example through their centres, and extends downwardly from the point of connection of the support member to the frame. The third axis extends at an angle to a vertical line passing through the point of connection of the support member to the frame, i.e. the third axis is not exactly vertical or horizontal.

The provision of a ground engaging sphere that is rotatable about a plurality of axes in the manner described above is novel and inventive in other contexts and thus when viewed from a second aspect, the invention provides a vehicle which comprises a frame; a first ground engaging member which is rotatable about at least a first axis; a second ground engaging member which is a sphere and which is rotatable about a plurality of axes and gripping portions which are provided towards the front of the vehicle frame, for a rider to hold;

characterised in that a support member is connected pivotally to a portion of the frame and projects longitudinally of the vehicle and downwardly from the point of connection to the frame to a remote part of the support member; the second ground engaging member is connected to the remote part of the support member for rotation about a second axis which is transverse and fixed relative to the support member; and the support member is pivotal with respect to the frame about a third axis which extends downwardly and longitudinally of the vehicle.

As discussed earlier, the expression "sphere" means a body having a substantially or approximately spherical ground engaging contact surface, regardless of the shape of the remainder of the body. Also, preferably, the third axis passes through the sphere such as through the centre of the sphere or close to the centre of the sphere.

The longitudinal direction could be a forward-facing directions or a rearward-facing direction. The support member projects downwardly, but this does not necessarily mean continuously downward. For example, it could extend horizontally and then downwardly. This applies equally to the longitudinal and downward projection of the support member and corresponding third axis according to the first aspect.

It will be appreciated that in accordance with the second aspect, the second ground engaging member is not necessarily a rear sphere, but could instead be a front sphere. Accordingly the first ground engaging member could be positioned at the rear of the vehicle.

It will also be appreciated that the first ground engaging member may be, but is not necessarily, a sphere. It could have any form that can perform the function of a wheel. As non-limiting examples, it could be a conventional wheel, e.g. a solid wheel or toroidal member connected by spokes to a central pivot point for example as in a conventional bicycle wheel, or multiple wheels, or casters. In the case that it is a sphere, the at least one first axis may comprise one, two, three or more axes. The sphere could be freely rotatable in all directions.

For this second aspect of the invention, the direction of the third axis could alternatively be expressed as follows: The third axis lies in a vertical plane that passes through the first and second ground engaging members, for example through their centres, and extends downwardly from the point of connection of the support member to the frame. The third axis extends at an angle to a vertical line passing through the point of connection of the support member to the frame, i.e. the third axis is not exactly vertical or horizontal. The centre of the first ground engaging member used in defining the vertical plane of the support member may be a central region rather than a central point. For example, in the case that the front ground engaging member comprises casters, or a pair of laterally spaced wheels, the vertical plane is considered to pass through the centre thereof if it passes between the lateral extreme of the points of contact of the first ground engaging members with the ground during use, i.e. the vertical plane is substantially parallel to the direction of motion of the vehicle when it is propelled forwards by the rider without turning.

Certain features of the rear ground engaging sphere of some embodiments of the invention are described below, with reference to the first aspect of the invention. It will be appreciated that these features may also apply to the second ground engaging member of the second aspect of the invention, in an equivalent manner.

The rear ground engaging sphere of the first aspect could be freely rotatable about the third axis, but preferably it is rotatable by up to a fixed angle in both directions. The fixed angle is preferably no more than about 90°, (i.e. a total range of rotational movement of no more than about 180°) more preferably about between 60° and 90° (i.e. a total range of about 120° to 180°), and most preferably about 85° (i.e. a total range of about 170°). This could be achieved by having stops that restrain the rotation of the support member.

The angle of the third axis to the vertical line passing through the point of connection of the support member to the frame could be any acute angle (i.e. any angle such that the axis extends downwardly), but preferably is between about 30° to 60°, or about 35° to 55°, or about 40° to 50°, and in some preferred embodiments is about 45°.

The other ground engaging support member, as compared to the particular sphere mounted for rotation about the plurality of axes as discussed above, can be mounted in any appropriate manner. For example, a support member could be provided that is fixably connected to a front portion of the frame, the support member having a remote part, where the front sphere is connected to the remote part of the front support member for rotation about the first axis. The front support member could be at any suitable angle to a vertical line passing through the point of connection of the front support member to the frame. For example, it could be at an angle of less than 90°, extending forwardly or rearwardly. Alternatively, the support member could be substantially vertical or horizontal.

It will be appreciated that in embodiments where the vehicle comprises two ground engaging spheres connected to the frame by respective support members, any combination of orientations of the support members discussed above is possible, e.g. both oriented downwardly and forwardly, both oriented downwardly and rearwardly, both oriented downwardly with one forwardly (which could be either the front or the rear support member) and the other rearwardly, etc.

It will be appreciated that references to vertical, rearwards and forwards are references to when the vehicle is in use with both spheres lying on a horizontal surface, and that references to vertical or horizontal are not meant to imply a strict geometrical orientation but include some angular deviations from either.

In some embodiments of the invention, the gripping portions are fixed. By this is meant that the gripping portions are not moved relative to the frame to effect steering of the vehicle. The gripping portions could be separate portions of a single member such as a handle extending across the vehicle, or could be completely separate members. However, a certain degree of movement could be permitted, which whilst not per se steering the vehicle, could introduce the rider to the sensation of movement of a steering system whilst moving.

In some alternative embodiments, limited or full steering could be provided. Thus, the front ground engaging member, whether in the form of e.g. a sphere or a wheel, could be steerable in a conventional manner. The front ground engaging member could be connected to a second support which is connected to a steering mechanism. Thus, a second support member could be connected pivotally to a portion of the frame and connected to a steering member such as handlebars; and the first ground engaging member is connected to a remote part of the second support member for rotation about the first axis which is transverse. The second support member could project longitudinally of the vehicle and downwardly from the point of connection to the frame to the remote part of the support member. The support member could be pivotal with respect to the frame about an axis which extends downwardly and longitudinally of the vehicle.

The frame could be composed of a number of separate portions. These separate portions could have distinct uses. For example, the frame could comprise a front housing for the front sphere, a rear housing for the rear sphere; and a connecting member which interconnects the front housing and the rear housing.

In embodiments where the vehicle is a sit on vehicle and the frame comprises a front housing and a rear housing connected together, for example by a connecting member, preferably a seat portion is situated between the front and rear housings. In some embodiments the seat is positioned below the tops of the front and rear housings. In some embodiments, the connecting member is connected to the top of the front housing, extends from the front housing to the rear housing and is connected to the top of the rear housing. In some embodiments, the seat portion is defined by a depressed portion of the connecting member between the front housing and the rear housing. The connecting member may in the form of a continuous, elongate member. The front housing and the rear housing may both have exterior surfaces which are part-spherical. In such an arrangement, preferably the elongate member is curved upwardly to follow the profile of the front housing, is then curved downwardly to define the seat, and is curved upwardly again to follow the profile of the rear housing. The gripping portions may be mounted on the connecting member.

There may be provided on each side of the vehicle a platform extending longitudinally, below the level of the seat portion. These platforms can also comprise part of the connecting means. Additional or alternative connecting means could be employed, in embodiments where the frame comprises separate front and rear housing portions. The vehicle may be provided with stabilising members. A first stabilising member may be mounted on the platform on one side of the vehicle and a second stabilising member may be mounted on the platform on the other side of the vehicle. The stabilising members may be positioned in longitudinal alignment with the seat portion. The first and second stabilising members may be removable from the vehicle.

For a vehicle in accordance with the first aspect of the invention, the front and rear spheres behave predictively, the front sphere behaving like a wheel, and the rear sphere providing a predictable steering behaviour. For a vehicle in accordance with the second aspect of the invention, at least the second ground engaging member behaves predictively, providing a predictable steering behaviour. This provides an advantage in terms of stability, whilst still permitting the vehicle to be steered without the use of a steering column rotated by handlebars.

The use of at least one sphere rather than conventional wheels also means that the vehicle will not fall awkwardly either on top of or underneath a rider.

The vehicle may for example be constructed principally from plastics materials or any other suitable materials including wood, metals and composites.

An embodiment of the invention will now be described by way of example only and with reference to the accompanying drawings, in which:

FIG. 3 is a schematic cut-away view of part of a vehicle in accordance with an embodiment of the present invention;

FIG. 4 shows the rear ground engaging sphere and support member viewed along a direction perpendicular to the transverse second axis and to a longitudinal axis of the support member;

FIG. 5 shows the rear sphere and support member viewed along a longitudinal axis of the support member.

Figure 1:
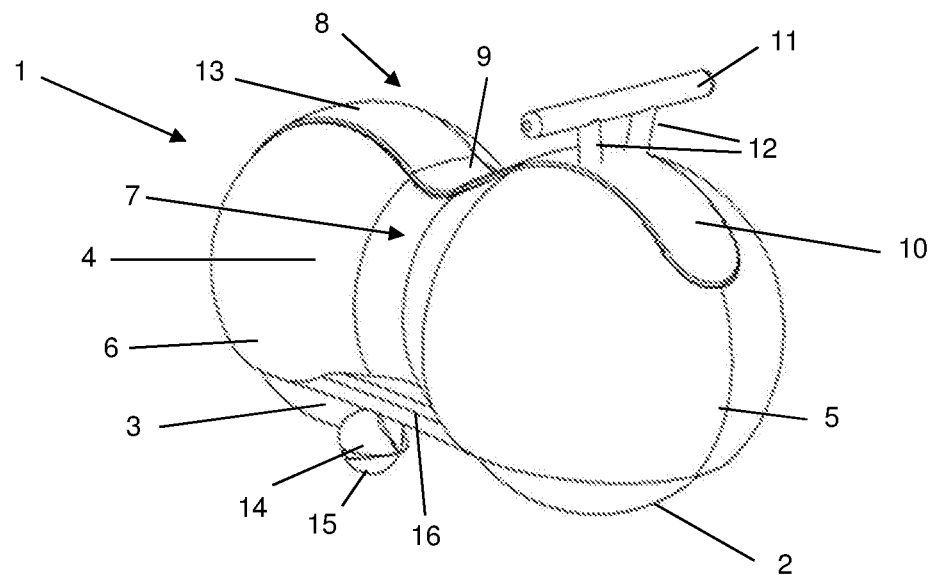
FIG. 1 is a perspective view of a vehicle according to an embodiment of the invention, viewed from the front and one side.
Figure 2:
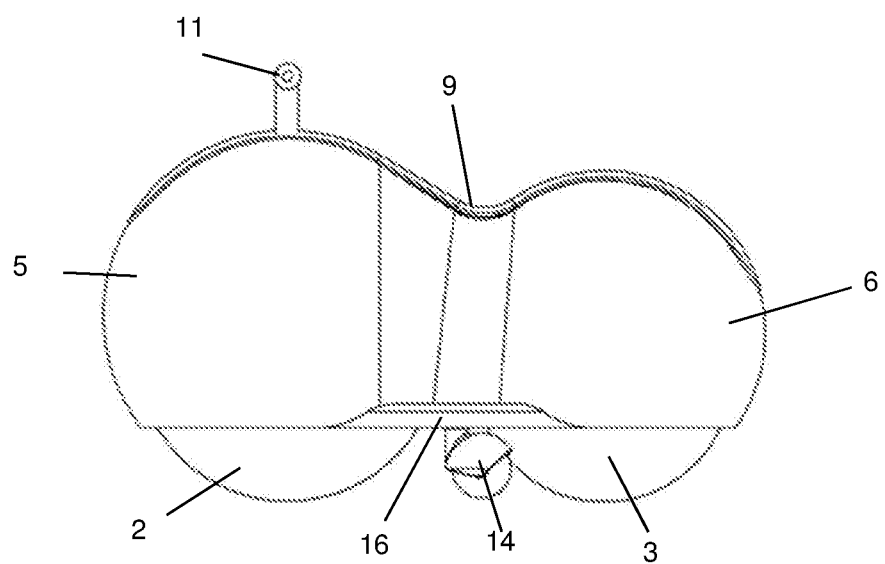
FIG. 2 is a side view of the vehicle of FIG. 1.

FIG. 1 shows a perspective view from the front and one side of a vehicle 1 according to an embodiment of the present invention. FIG. 2 shows a side view of the vehicle 1. The vehicle 1 comprises a front ground engaging sphere 2 and a rear ground engaging sphere 3, and a housing 4. The housing 4 comprises a front housing portion 5 and a rear housing portion 6 connected by a connecting portion 7. The portions could be separate members or at least two of the portions could be parts of the same member, The vehicle also comprises a continuous, longitudinal rigid support 8 which is curved to provide a lowered seat portion 9. A front portion 10 of the support 8 is attached to the front housing portion 5, which is part-spherical and encases the front ground engaging sphere 2. The front portion 10 of the support 8 follows the exterior profile of the front housing portion 5. Attached to the support 8, over the front housing portion 5, is a fixed, transverse handle 11 having a pair of support members 12. The support 8 also has a rear portion 13 which is connected to the rear housing portion 6, which is part-spherical and encases the rear ground engaging sphere 3. The rear portion 13 of the support 8 follows the exterior profile of the rear housing portion 6.

The front ground engaging sphere 2 is mounted in the front housing portion 5 for rotation about a single, fixed transverse axis 34. The rear ground engaging sphere 3 is mounted in the rear housing portion 6 and is mounted for rotation about a plurality of axes, as described further below with reference to FIGS. 3-5.

A removable pair of stabilisers 14 containing rotating portions 15 are provided in this embodiment. The stabilisers are in the form of casters, which are attached to platforms 16 extending between the front housing portion 5 and the rear housing portion 6. The casters are rotatable about vertical axes. The rotating portions 15 may be spheres rotatable about three orthogonal axes. The stabilisers 14 are provided in vertical alignment below the seat portion 9. It will be appreciated that in some embodiments, the vehicle 1 may be provided without stabilisers 14 and/or without the platforms 16.

The seat portion 9 is provided between the front housing portion 5 and the rear housing portion 6 in a lower part of the support 8. This is at a height where a rider, typically a young child, can touch the ground with both feet and can propel the vehicle using the feet.

FIG. 3 shows a schematic cut-away view of the vehicle 1 but shown without the front and rear housing portions 5, 6, the support 8, or the handle 11. The vehicle is provided with an internal frame 17. The frame has a front frame portion 18, a rear frame portion 19 and a lowered portion 20 which corresponds to the seat region 9 as shown in FIG. 1.

In the present embodiment, the frame 17 is provided beneath the housing 4 as shown in FIG. 1 and is connected thereto. However, it will be appreciated that in other embodiments the housing 4 and the frame 17 could comprise a single structure, such that the housing 4 provides the function of the frame 17, rather than a separate frame being provided.

The front sphere 2 is mounted on the frame by means of a front support member 21. The front support member is fixedly attached to the frame 17 at a point of connection 22, and extends forwardly and downwardly to a remote end 23. The front sphere 2 is mounted on an axle 24 which is transverse and fixed to the front support member 21, the front sphere 4 being freely rotatable about the axis 34 of the axle 24.

The rear sphere 3 is connected to the frame 17 by a rear support member 25. The rear support member 25 is connected to the frame at a connection point 26 by means of a bearing 27 so that the rear support member 25 is pivotal with respect to the frame 17. The rear support member 25 is positioned at an angle A to a vertical line through the centre of the rear sphere. In the present embodiment, the angle A is 45°, although it will be appreciated that other angles are possible. The details of the mounting of the rear sphere 3 via the rear support member 25 is described in greater detail with reference to FIGS. 4 and 5.

FIG. 4 shows the rear sphere 3 of the vehicle 1 mounted on the rear support member 25. The rear support member 25 comprises an axle 28, a semi-circular axle mount 29, and a connecting portion 30, which is perpendicular to the axle 28, and which is received in the bearing 27. The rear sphere 3 is freely rotatable about the axis 36 of the axle 28. The axle is mounted in bearings 31 at each end of the axle mount 29.

FIG. 5 shows the rear sphere 3 and the rear support member 25 as viewed along the direction indicated by the arrow B in FIG. 3. The rear support member is mounted such that it may move pivotally in the direction shown by the arrows C shown in FIG. 5, i.e. the support member 25 (and thus the sphere 3) are rotatable about an axis 38 passing through the connection point and the centre of the sphere 3. In the present embodiment, the rear support member is configured to be rotatable by up to 85° in either direction. Stops 32 are provided to restrain the rotational movement of the support member to prevent rotation beyond 85° in either direction.

As shown in FIG. 3 the rear support member 25 is positioned at an acute angle A to a vertical line passing through the rear sphere 3. The rear support member 25 thus extends forwardly and downwardly with respect to the connection point 26. This configuration provides the behaviour of the vehicle in response to a rider propelling it forward while leaning to turn left or right, as described above.

It will be appreciated that only one possible embodiment of the present invention has been illustrated described and that many other variations are possible. The particular embodiment described herein possesses features such as the orientation of the support members, angles of rotational movement, and so forth as described above with reference to the first aspect of the invention. Other embodiments in accordance with the first and/or second aspects are possible.

In some embodiments of the invention, there is provided a vehicle which comprises a frame; a front ground engaging sphere which is rotatable about a first axis which is transverse and fixed relative to the frame; a rear ground engaging sphere (which is rotatable about a plurality of axes, and gripping portions which are provided towards the front of the vehicle, for a rider to hold. A support member is connected pivotally to a rear portion of the frame and projects longitudinally of the vehicle and downwardly from a point of connection to the frame to a remote part of the support member. The rear sphere is connected to the remote part of the support member for rotation about a second axis which is transverse and fixed relative to the support member. The support member is pivotal with respect to the frame about a third axis which extends downwardly and longitudinally of the vehicle.

In some embodiments of the invention, the third axis passes through the rear sphere, in some embodiments through, or adjacent to, the centre of the rear sphere. In some embodiments the third axis extends downwardly at an angle of from 30° to 60°. In some embodiments the support member extends forwardly from the point of connection of the support member to the frame; and the third axis extends downwardly and forwardly from the point of connection of the support member to the frame. In some embodiments the rear ground engaging sphere is rotatable about the third axis by a limited angle and in some embodiments the limited angle is no more than 180°. In some embodiments there is a seat for a rider, positioned so that a rider sitting on the seat can propel the vehicle by the rider's feet engaging the ground.

The invention claimed is:

1. A vehicle comprising a frame; a front ground engaging sphere which is rotatable about a first axis which is transverse and fixed relative to the frame; a rear ground engaging sphere which is rotatable about a plurality of axes; and gripping portions which are provided towards the front of the vehicle, for a rider to hold;

wherein a support member is connected pivotally to a rear portion of the frame at a point of connection to the frame and projects longitudinally of the vehicle and downwardly from the point of connection to the frame to a remote part of the support member; the rear sphere is connected to the remote part of the support member for rotation about a second axis which is transverse and fixed relative to the support member; and the support member is pivotal with respect to the frame about a third axis which extends downwardly and longitudinally of the vehicle.

2. The vehicle of claim 1, wherein the third axis passes through the rear sphere.

3. The vehicle of claim 2, wherein the third axis passes through, or adjacent to, a centre of the rear sphere.

4. The vehicle of claim 1 wherein the third axis extends downwardly at an angle of from 30° to 60° to a vertical line passing through the point of connection of the support member to the frame.

5. The vehicle of claim 1, wherein the support member extends forwardly from the point of connection of the support member to the frame; and the third axis extends downwardly and forwardly from the point of connection of the support member to the frame.

6. The vehicle of claim 1, wherein the rear ground engaging sphere is rotatable about the third axis by a limited angle.

7. The vehicle of claim 6, wherein the limited angle is no more than 180°.

8. The vehicle of claim 1, comprising a seat for a rider positioned so that a rider sitting on the seat can propel the vehicle by the rider's feet engaging the ground.

* * * * *